United States Patent
Knight

Patent Number: 5,862,048
Date of Patent: Jan. 19, 1999

[54] MICROPROCESSOR BASED ELECTRO-PNEUMATIC LOCOMOTIVE BRAKE CONTROL AND TRAIN MONITORING SYSTEM

[75] Inventor: Arnold W. Knight, New Brighton, Minn.

[73] Assignee: New York Air Brake Corporation, Watertown, N.Y.

[21] Appl. No.: 318,464

[22] Filed: Oct. 5, 1994

[51] Int. Cl.[6] .................................................. G05B 15/02
[52] U.S. Cl. .......................... 364/138; 364/131; 364/132; 303/15
[58] Field of Search ..................................... 364/131, 132, 364/138, 184, 426.01; 303/13, 15

[56] References Cited

U.S. PATENT DOCUMENTS

| | | | |
|---|---|---|---|
| 3,696,758 | 10/1972 | Godinez, Jr. | 105/61 |
| 4,023,753 | 5/1977 | Dobler | 246/5 |
| 4,041,283 | 8/1977 | Mosier | 235/150.2 |
| 4,041,470 | 8/1977 | Slane et al. | 364/900 |
| 4,042,810 | 8/1977 | Mosher | 235/150.2 |
| 4,181,369 | 1/1980 | Balukin | 303/16 |
| 4,344,138 | 8/1982 | Frasier | 364/426 |
| 4,582,280 | 4/1986 | Nichols et al. | 246/182 R |
| 4,651,317 | 3/1987 | Tashiro et al. | 370/86 |
| 4,652,057 | 3/1987 | Engle et al. | 303/3 |
| 4,752,899 | 6/1988 | Newmam et al. | 364/550 |
| 4,774,669 | 9/1988 | Schmitz et al. | 364/436 |
| 4,817,019 | 3/1989 | Morihara | 364/550 |
| 4,904,027 | 2/1990 | Skantar et al. | 303/15 |
| 4,944,564 | 7/1990 | Balukin et al. | 303/33 |
| 4,971,399 | 11/1990 | Balukin et al. | 303/33 |
| 5,064,251 | 11/1991 | Romansky | 303/3 |
| 5,104,203 | 4/1992 | Ferri | 303/15 |
| 5,172,316 | 12/1992 | Root et al. | 364/426.01 |
| 5,192,118 | 3/1993 | Balukin et al. | 303/15 |
| 5,201,834 | 4/1993 | Grazioli et al. | 246/169 R |
| 5,222,788 | 6/1993 | Dimsa et al. | 303/15 |
| 5,249,125 | 9/1993 | Root et al. | 364/426.01 |
| 5,286,096 | 2/1994 | Ferri et al. | 303/15 |
| 5,393,129 | 2/1995 | Troiani et al. | 303/3 |

FOREIGN PATENT DOCUMENTS 2088796 8/1993 Canada.

Primary Examiner—Paul P. Gordon
Attorney, Agent, or Firm—Barnes & Thornburg

[57] ABSTRACT

A computerized electro-pneumatic braking system that includes a train monitoring system. Preferably, the braking system control device is installed on all vehicles on the train. When braking is initiated, the system applies the brakes instantaneously and simultaneously to all the vehicles on the train, bringing the train to a stop quickly. Sensors on the system's control device also monitor operating conditions of each vehicle and report the results to the master controller.

15 Claims, 1 Drawing Sheet

MICROPROCESSOR BASED ELECTRO-PNEUMATIC LOCOMOTIVE BRAKE CONTROL AND TRAIN MONITORING SYSTEM

BACKGROUND OF THE INVENTION

The present invention relates generally to novel and improved electro-pneumatic railroad train brakes, and more particularly to microprocessor controlled electro-pneumatic brakes with a train monitoring system.

Pneumatic train braking systems have been used in the railway industry for over 120 years. Electronically controlled, or electro-pneumatic ("E-P") brakes have also been available in the recent past. However, these E-P brakes have primarily been used only on shorter trains, such as commuter and passenger trains. Such applications have generally included only solenoid valves on the cars, activated directly by full voltage signal-power from the locomotive. However, this control method is impractical for very long trains which may possibly have over a hundred cars and reach over 13,000 feet in length. The tremendous amounts of current required to ensure that the braking system activates for the cars near the rear end of the train would be prohibitive.

Many of the E-P brakes, in their most recent development, are controlled by computers. In these modern braking systems, the computer receives various input data, performs the necessary calculations, and finally applies the brakes in the manner dictated by the program. In all electro-pneumatic and standard pneumatic braking schemes currently in use, the brakes are first applied at the locomotive. In today's automatic air brakes, after the braking action is initiated in the locomotive, air pressure in a pipe running the length of the train is reduced. This causes the control valve on each vehicle to supply air from the vehicle reservoir to the brake cylinder, ultimately applying the brakes in the vehicle. This method of braking is little changed since the first pneumatic brake was invented.

The disadvantage in this classic braking system is that the last vehicle in the train has its brakes applied last due to the time it takes for the pressure change in the pipe to travel the distance to the vehicle. Therefore, the time from when braking is desired to the time when the brakes are actually applied increases as train length increases. For long trains, the application of the brake and the actual braking action may trail each other by as much as 90 seconds. In a train traveling 60 to 70 miles per hour, this could potentially translate into 9000 feet of travel before full braking is achieved.

Another disadvantage in current railway train design is that the engineer has no access to critical operating data from other vehicles in the train. The computers used in modern E-P braking systems have very little functionality beyond applying the brakes and other brake associated tasks. These computers, in general, receive inputs of pressure measurements, or operating conditions of the pressure system, or other brake system data that is obtained locally in the locomotive. However, no data is available to the computer from the other vehicles which may be attached to the train.

It is therefore an object of this invention to provide a system whereby train braking is achieved virtually instantaneously and simultaneously throughout the train, without incurring the time lag from application of the brake to actual braking. Another object of the invention is to provide the E-P computer system with data concerning the operating conditions of other vehicles on the train.

SUMMARY OF THE INVENTION

To provide an improved railroad train braking system comprising an apparatus for electronically controlling pneumatically actuated train brakes, there is provided a control device to monitor and control brake control valve functions, a master controller for instructing the control device, a communications means between the control device and the master controller, and a power source for providing power to the control device and master controller. The master controller may be a computer, which, when instructed to brake, instantaneously instructs the control device to apply the brakes on each vehicle in the train simultaneously. This eliminates the lag time between application of the brake by the engineer and the actual braking action by the individual vehicles. The control device, which is fitted with sensors, also monitors operating conditions on all vehicles connected to the train, compiles the data on the computer, and reports the results to the train engineer via an output device. Other objects and advantages of the invention will become apparent upon reading the following detailed description and upon reference to the drawings. Throughout the drawings, like reference numerals refer to like parts.

DETAILED DESCRIPTION OF A PREFERRED EMBODIMENT

Figure 1:
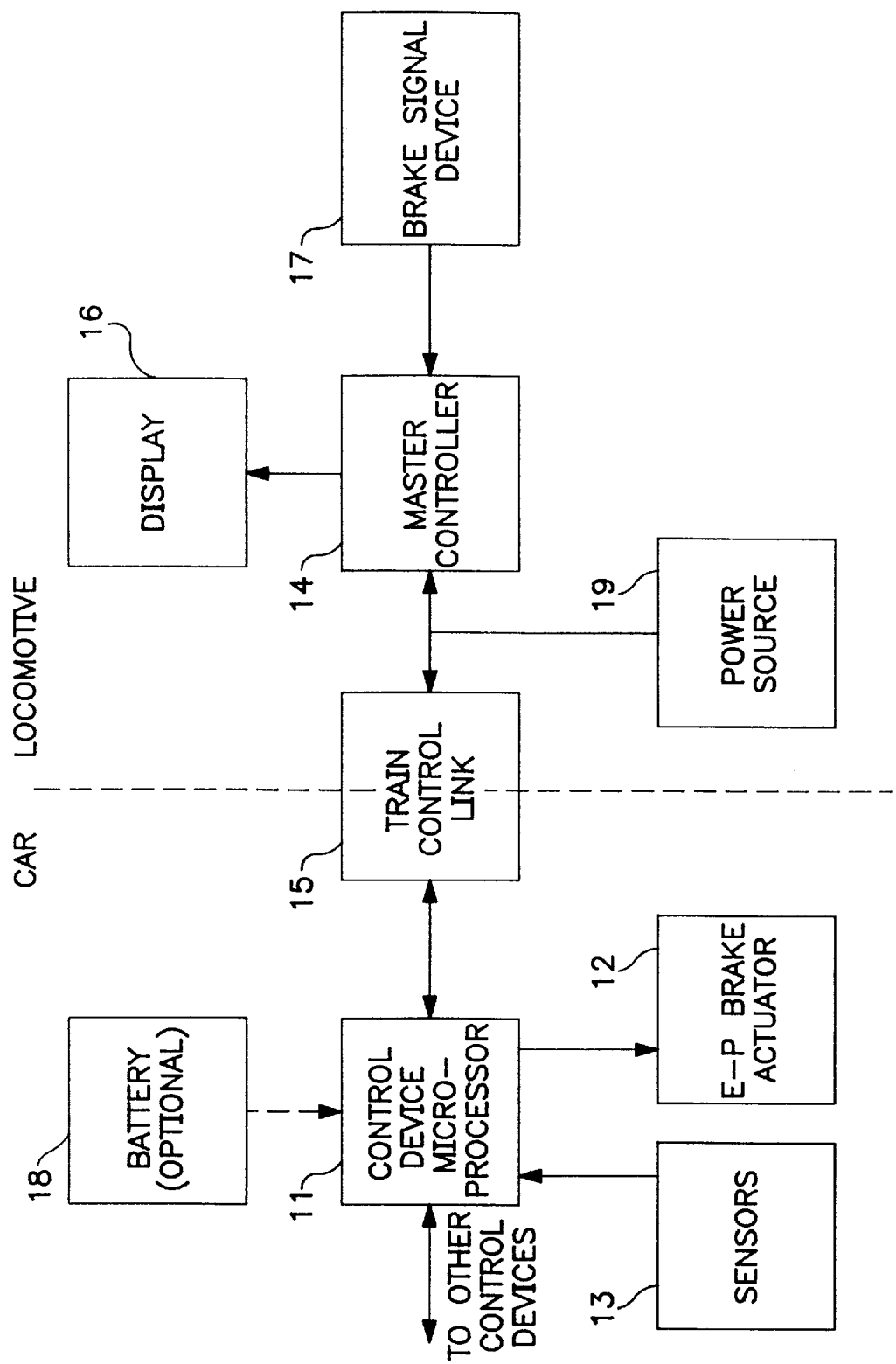
FIG. 1 shows a block diagram of a microprocessor based electro-pneumatic brake and train monitoring system.

Referring to FIG. 1 of the drawing, there is shown an electro-pneumatic ("E-P") brake control system having a microprocessor based control device 11 that attaches to the control valve of the E-P brake actuator 12 of each vehicle attached to the train. The control device 11 is connected to a plurality of sensors 13 for monitoring various operating conditions of the vehicle. The control device 11 is then connected via a train control link 15 to a master controller 14. The master controller 14 may be connected to a computer with storage capabilities and display terminal 16 or other output device. When braking is initiated through the brake signal device 17, the master controller 14 instructs the control device 11 to apply the brakes. The master controller 14 also stores and retrieves information from the control device 11 and displays this information on display terminal 16.

The control device 11 interfaces with other similar devices and the master controller 14 in much the same manner as a computer local area network. Each control device 11 may be considered a node on the network, the train itself can be thought of as the network, and the master controller 14 as the server. The signal is carried by the train control link 15 between the master controller 14 and all the other control devices 11 on the train. A suitable microprocessor that may be used in the control device 11 is sold under the trademark LonWorks by Echelon Corp. of Palo Alto, Calif. The Echelon device incorporates Echelon's network chip sold under the trademark Neuron. The Neuron chip monitors all activity, on each vehicle of the train, and sends information to the master controller 14. The master controller 14 constantly polls the cars to confirm that the system is intact and functioning and to collect vehicle operation data. The polling may be interrupted at any time should the control device 11 generate an interrupt request for a high priority situation. If multiple interrupts arise, higher priority situations can override lower priority matters.

The control device 11 performs a variety of braking and diagnostic functions. These include: stuck brake identification and release while the train is in motion; collective graduated release of train brakes; out of tolerance brake cylinder pressures; accelerated direct release of the brakes; source location of emergencies; wheel off detection; vehicle identification by number and location on train; status of every train vehicle; and computer retrieval of data. Other optional features include, but are not limited to, hot box detection and sliding flat wheels.

The train control link 15 in its simplest form consists of a pair of two wire cables running from the master controller 14 to the last control device 11 at the end of the train. The train control link carrying control device information and instructions between the master controller 14 and the other control devices 11. Additionally, the train control link wire can be utilized for providing power to the control device 11 and master controller 14. However, the information transported by the train control link 15 does not have to be limited to passage by wire. Power Line Carrier (PLC), Radio Frequency (RF), Infra-Red (IR), and fiber optic technology are several of various viable alternatives.

The system is powered by a power source 19. The power source 19 provides the necessary operating power via the train control link 15 to the control device 11. An optional battery 18 may also be used to provide power should the power through the train control link 15 not be sufficient for meeting operating requirements. In such a case, the control device 11 would operate from the battery 18, and the train control link 15 would trickle charge the battery 18 as it discharged.

The present invention has been described with respect to certain embodiments and conditions which are not meant to and should not be construed to limit the scope of the invention. Those skilled in the art will understand that variations from the embodiment and conditions described herein may be made without departing from the true scope of the invention as defined in the appended claims.

What is claimed is:

1. For use in a railroad train comprising a plurality of interconnected vehicles including at least one locomotive and a plurality of cars, the improvement comprising an apparatus for electronically controlling pneumatically actuated train brakes, the apparatus comprising in combination:

a digital control device on each car to electrically control and monitor electro-pneumatic brake control valve functions on said car;

a master controller on a locomotive for instructing the control devices on each car;

a Neuron chip on each car in a LonWorks network between the control device on each car and master controller for exchanging information and instructions; and power source means for providing power to the control device on each car and master controller.

2. The apparatus of claim 1 where the control device has sensors for monitoring train and brake operating conditions.

3. The apparatus of claim 1 where the master controller continually polls the control devices at predetermined intervals on each car for current operating conditions.

4. The apparatus of claim 1 where the master controller is a computer used to store and retrieve information provided by the control devices.

5. The master controller of claim 4 where the computer includes means for entering operating instructions for the control devices and for viewing control device information.

6. A method for electronically controlling pneumatically actuated train brakes and monitoring status of a railroad train comprising a plurality of interconnected vehicles including at least one locomotive and a plurality of cars, the method comprising the steps of:

providing a microprocessor driven LonWorks network with a Neuron chip node at each car and a master controller on a locomotive communicating directly with a control device on each car;

sensing application of pneumatic brakes in one vehicle; and transmitting a braking signal on said network for applying electro-pneumatic brakes co-extensively and simultaneously in every vehicle in the train.

7. The method according to claim 6 including the step of causing the control devices to control electro-pneumatic brake control valves and, further, to monitor vehicle operating conditions.

8. The method according to claim 6 in which the master controller sends instructions to the control devices.

9. The method according to claim 6 where the master controller is a computer used for storing and retrieving information from the control devices.

10. The method according to claim 9 wherein the computer displays information obtained from the control devices.

11. The method according to claim 6 wherein the network relays data and instructions between the control devices and the master controller.

12. An apparatus for monitoring operating conditions on a railroad train comprising a plurality of interconnected vehicles including at least one locomotive and plurality of cars, the apparatus comprising in combination:

a control device on each car for electrically controlled electro-pneumatic brakes;

a plurality of sensors on each control device for monitoring vehicle operating conditions;

a master controller on a locomotive for receiving information from the control devices on each car;

a microprocessor driven LonWorks node network for direct communication between a Neuron chip node at each control device on each car and master controller for exchanging information; and power source means for providing power to the control device on each car and master controller.

13. The apparatus of claim 12 where the control device transmits current operating conditions to the master controller.

14. The apparatus of claim 12 where the master controller is a computer used to store and retrieve information provided by the control devices from said sensors.

15. The apparatus of claim 14 where the computer is used to enter operating instructions and view control device information.

* * * * *